(12) United States Patent
Sakurai

(10) Patent No.: US 7,798,467 B2
(45) Date of Patent: Sep. 21, 2010

(54) HIGH VACUUM VALVE

(75) Inventor: Toyonobu Sakurai, Tsukubamirai (JP)

(73) Assignee: SMC Corporation, Chiyoda-ku, Tokyo (JP)

( * ) Notice: Subject to any disclaimer, the term of this patent is extended or adjusted under 35 U.S.C. 154(b) by 374 days.

(21) Appl. No.: 12/009,062

(22) Filed: Jan. 16, 2008

(65) Prior Publication Data

US 2008/0173842 A1 Jul. 24, 2008

(30) Foreign Application Priority Data

Jan. 17, 2007 (JP) ................ 2007-008197

(51) Int. Cl.
*F16K 31/00* (2006.01)
(52) U.S. Cl. .............. 251/63.6; 251/63.5; 251/335.3
(58) Field of Classification Search ............ 251/62, 251/63.5, 63.6, 335.1, 335.3
See application file for complete search history.

(56) References Cited

U.S. PATENT DOCUMENTS

| 5,678,595 | A | * | 10/1997 | Iwabuchi | ............... | 137/341 |
|---|---|---|---|---|---|---|
| 5,941,506 | A | * | 8/1999 | Smith et al. | ............... | 251/335.3 |
| 6,478,043 | B2 | * | 11/2002 | Ishigaki | ............... | 137/341 |
| 6,494,229 | B2 | * | 12/2002 | Kajitani | ............... | 137/530 |
| 6,805,152 | B2 | * | 10/2004 | Kanzaka et al. | ............... | 137/341 |
| 7,011,295 | B2 | * | 3/2006 | Kajitani | ............... | 251/335.3 |

FOREIGN PATENT DOCUMENTS

| JP | H07-198063 A | 8/1995 |
|---|---|---|
| JP | 2995450 B | 1/1996 |
| JP | 09-133238 | 5/1997 |

* cited by examiner

*Primary Examiner*—John K Fristoe, Jr.
(74) *Attorney, Agent, or Firm*—Yokoi & Co., U.S.A., Inc.; Toshiyuki Yokoi

(57) ABSTRACT

The high vacuum valve includes a valve housing having a valve flow channel provided in an interior thereof, two ports connected to the valve housing so as to be arranged perpendicular relative to each other, and capable of being communicated with each other through the valve flow channel, a valve member housed in the valve flow channel for opening and closing the valve flow channel, a valve shaft received in the valve flow channel for causing the valve member to perform opening/closing operations, and an assembly comprising a tubular member and a welded bellows and hermetically surrounding a periphery of the valve shaft, the assembly being fixed at one end portion thereof to a rear face of the valve member and fixed at the other end portion thereof to a portion of the interior of the valve housing which is opposed to the rear face of the valve member.

2 Claims, 2 Drawing Sheets

PRIOR ART

HIGH VACUUM VALVE

CROSS-REFERENCES TO RELATED APPLICATIONS

The present application is related to the Japanese Patent Application No. 2007-008197, filed Jan. 17, 2007, the entire disclosure of which is expressly incorporated by reference herein.

BACKGROUND OF THE INVENTION

1. Field of the Invention

The present invention relates to a high vacuum valve which is to be used in order to depressurize a vacuum chamber for chemical reaction in a physical or chemical machine or the like, and which is to be used in other fields.

2. Description of the Related Art

For example, in a manufacturing apparatus for producing a semiconductor, a chemical treatment such as etching is performed in a vacuum chamber. At this time, a vacuum pump is used in order to depressurize the vacuum chamber and a high vacuum valve is used for closing and opening an external flow-channel which interconnects the vacuum pump and the vacuum chamber.

As shown, for example, in FIG. 2, the high vacuum valve generally comprises a housing 40 having an axially extending valve flow channel 41, two ports 42, 43 connected to openings 42a, 43a respectively formed in one end and side surface of the valve flow channel 41, and respectively connected to the vacuum pump and the vacuum chamber, a valve seat 44 provided around the opening of the one end of the valve flow channel 41, a valve member 45 for opening and closing the valve seat 44, a piston 46 for causing the valve member 45 to perform opening/closing operations, a valve shaft 47 interconnecting the piston 46 and the valve member 45, and a flexible metal-bellows 48 housed in the valve flow channel 41 and hermetically surrounding a periphery of a substantially total length of the valve shaft 47 (Japanese Patent Application Laid-Open No. 9-133238).

In the conventional high-vacuum valve constructed as discussed above, a molded bellows is employed as the metal bellows. The molded bellows is made by pressure-molding a cylindrical metal material to thereby cause concave regions and convex regions to be alternately formed along an axial direction of the cylindrical metal material. The molded bellows can be mass-produced by a few manufacturing processes, so that the molded bellows has the advantage that the manufacturing cost of the molded bellows can be restricted so as to be low. However, on the other hand, the molded bellows is poor in flexibility and bending property.

Incidentally, when in order to improve depressurization characteristic of the vacuum chamber, the capacity of the vacuum pump is improved and the flow rate of fluid passing through the vacuum valve is increased, high fluid-pressure is applied to the metal bellows provided in the valve flow channel. At this time, the fluid pressure is applied to the metal bellows as a force to be exerted in a bending direction. When such a force in the bending direction is repeatedly applied to the metal bellows, crack or the like is easy to be produced in the bellows by metal fatigue which is brought about by repeated bent-deformation of the bellows, so that there is a possibility that a life of the product will be reduced. This is noticeable particularly in the case of the molded bellows having the poor bending property as discussed above. When consideration is given to durability and manufacturing cost, it is desirable that a length of the metal bellows is rather short.

However, in the conventional high vacuum valve, if the length of the metal bellows is reduced in preference to durability, a sufficient stroke amount of the valve shaft, namely, a sufficient increase in valve-member opening can not be ensured, since the molded bellows is poor in flexibility as discussed above. Consequently, there is a problem that a sufficient flow rate of fluid allowed to flow by the valve can not be ensured.

BRIEF SUMMARY OF THE INVENTION

It is therefore an object of the present invention to provide a high vacuum valve which is superior in durability in that it can withstand the application of the valve under severe conditions that the valve is subjected to repeated application of high fluid-pressure, and which is inexpensive in that the manufacturing cost of the valve can be restricted.

In accordance with the present invention, there is provided a high vacuum valve which comprises a housing having a valve flow channel provided in an interior thereof so as to extend in a direction of an axial line, a first opening formed in one end of the valve flow channel relative to the direction of the axial line, and a second opening formed in the housing so as to be oriented toward a direction perpendicular to the axial line, a first port connected to the first opening of the housing and communicated with the valve flow channel through the first opening, a second port connected to the second opening and communicated with the valve flow channel through the second opening, a valve seat provided around the first opening, a valve member housed in the valve flow channel for opening and closing the valve seat, a valve shaft received in the valve flow channel and extending in the direction of the axial line from a rear face of the valve member in the valve flow channel, a valve member driving section for driving, through the valve shaft, the valve member in the direction of the axial line, and an assembly comprising a bellows and a tubular member, the bellows housed in the valve flow channel and hermetically surrounding a periphery of the valve shaft, the bellows comprising a welded bellows, the welded bellows being formed by causing a plurality of annular thin metal sheets to be overlapped, and alternately welding outer peripheries of adjacent metal sheets, and inner peripheries of adjacent metal sheets, the tubular member housed in the valve flow channel and hermetically surrounding the periphery of the valve shaft, the tubular member and the welded bellows being connected to each other in the direction of the axial line, and the assembly being fixed at an end portion of the bellows to the rear face of the valve member and fixed at an end portion of the tubular member to a portion of the interior of the housing which is opposed to the rear face of the valve member.

In a preferred embodiment of the present invention, the tubular member has a length approximately equivalent to a half of a length of the valve flow channel which is measured in the direction of the axial line.

According to the present invention, both the tubular member and the welded bellows superior to a molded bellows in flexibility are employed in order to hermetically surround the periphery of the valve shaft, thereby making it possible to restrict a length of the bellows while ensuring a flexing amount of the bellows which is required in connection with a stroke amount of the valve shaft. Consequently, it is possible to attain a reduction in the manufacturing cost of the valve.

Moreover, the welded bellows which is superior to the molded bellows in bending property is employed and the length of the welded bellows can be restricted to be short as discussed above, so that according to the present invention, there is provided the high vacuum valve which is superior in durability in that it can withstand the application of the valve under severe conditions that the valve is subjected to repeated application of high fluid-pressure, and in which a long life of the valve is ensured.

DETAILED DESCRIPTION OF THE PREFERRED EMBODIMENTS

Figure 1:
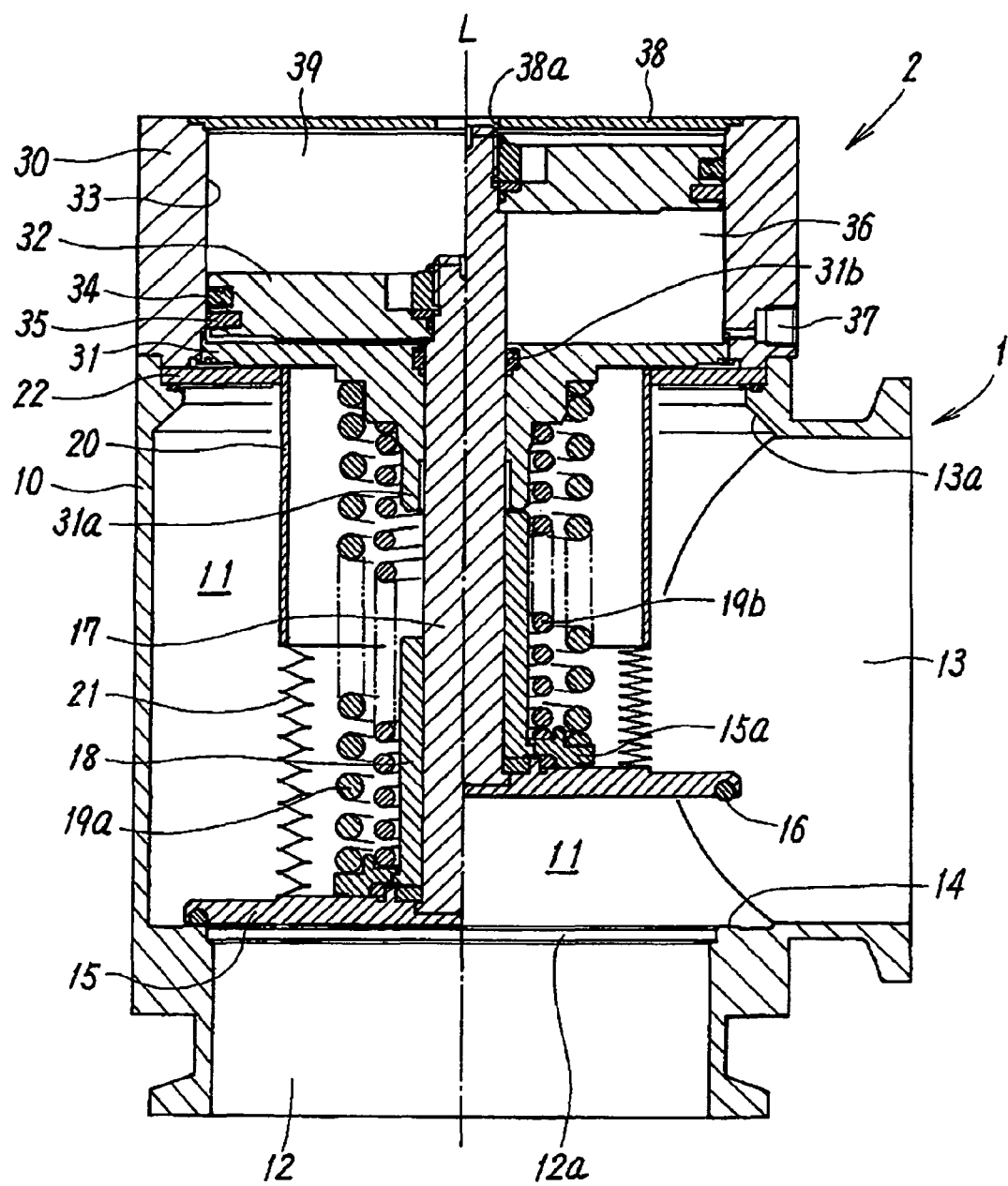
FIG. 1 is a schematic sectional view of a high vacuum valve according to a first embodiment of the present invention, in which a right half of the valve is shown in a valve-opened state and a left half of the valve is shown in a valve-closed state.
Figure 2:
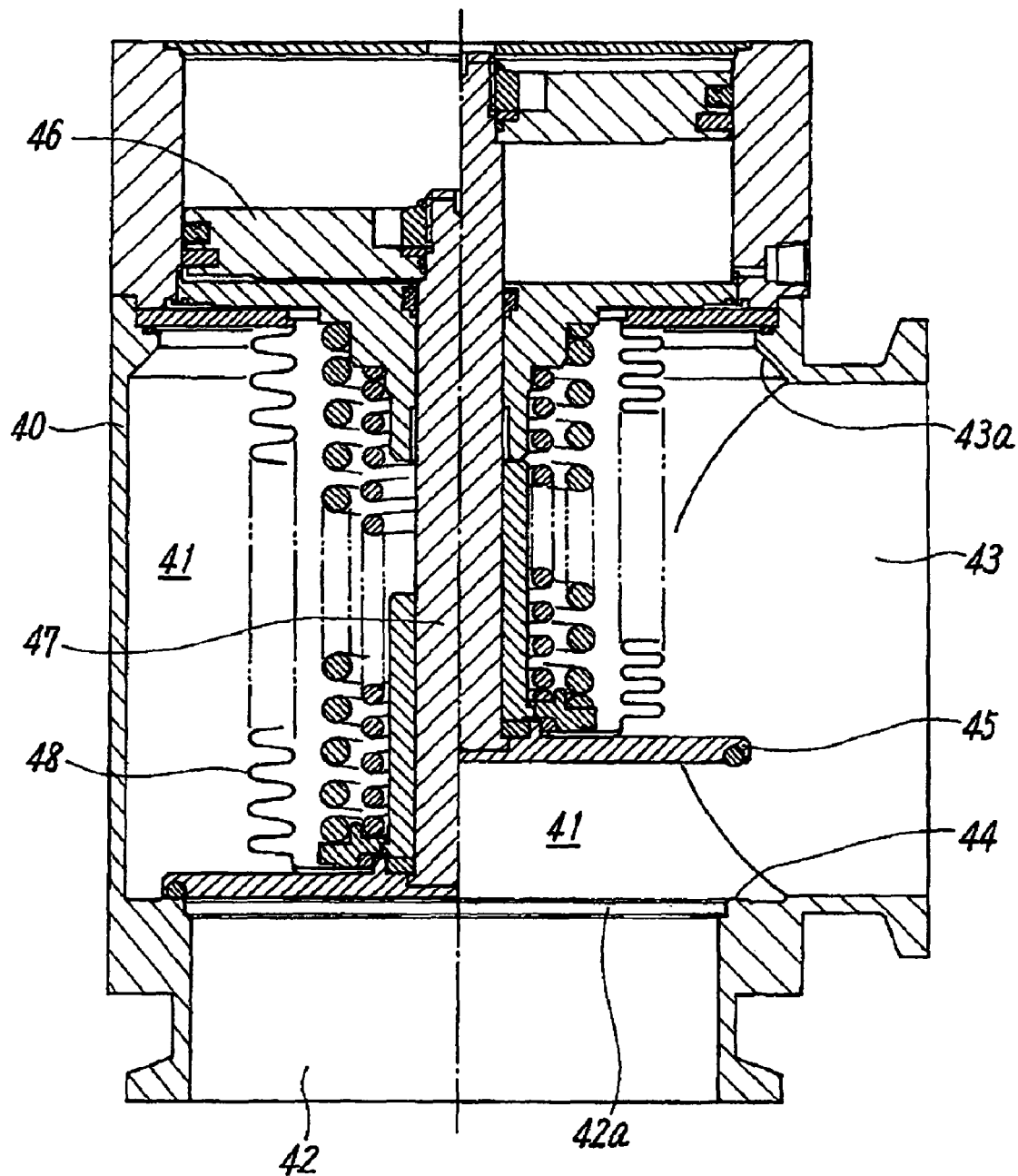
FIG. 2 is a schematic sectional view of a conventional high-vacuum valve, in which a right half of the valve is shown in a valve-opened state and a left half of the valve is shown in a valve-closed state.

Referring to FIG. 1, there is illustrated a high vacuum valve according to a first embodiment of the present invention. The valve comprises a valve body section 1, in which a valve flow channel 11 for causing a first port 12 and a second port 13 to be communicated with each other is adapted to be opened and closed by a valve member 15, and a fluid-pressure valve member driving section 2 which includes a piston 32 for causing the valve member 15 to perform opening/closing operations.

The valve body section 1 comprises a valve housing 10 which is formed into a substantially cylindrical-shape or a substantially square pole-shape and has first and second ends in a direction of an axial line L. The valve housing 10 comprises the valve flow channel 11 of a substantially circular shape in cross-section extending in the direction of the axial line L in the interior of the valve housing 10, the first port 12 provided on the side of the first end of the valve housing 10 so as to be coaxial with the axial line L, the second port 13 provided in a side wall of the valve housing 10 so as to be perpendicular to the axial line L, and a valve seat 14 provided in the valve flow channel 11. The first port 12 is communicated with the valve flow channel 11 through a first opening 12a of a circular shape which is formed in the first end of the valve housing 10 so as to be coaxial with the axial line L. On the other hand, the second port 13 is communicated with the valve flow channel 11 through a second opening 13a of a circular shape which is formed in the side wall of the valve housing 10 so as to be oriented to a direction perpendicular to the axial line L. The first port 12 and the second port 13 have the substantially same diameter. Moreover, the valve seat 14 is formed coaxially with the first opening 12a so as to surround a periphery of the first opening 12a.

In the interior of the valve housing 10, the valve member 15 of a poppet-type for opening and closing the valve seat 14 is provided so as to be coaxial with the valve seat 14. The valve member 15 is formed into a substantially disc-shape and has a rubber-made valve-sealing member 16 of an annular-shape which is adapted to be separatably contacted with the valve seat 14 and provided in a portion of a surface of the valve member 15 which faces the first opening 12a and is adjacent an outer peripheral edge of the valve member 15.

On the other hand, to a center portion of a rear face of the valve member 15, a tip end portion of a valve shaft 17 is fixed. The valve shaft 17 extends in the interior of the valve housing 10 so as to be coaxial with the axial line L. A base end portion of the valve shaft 17 is airtightly and slidably penetrated through a partition wall 31, which separates the valve body section 1 from the valve member driving section 2 on the side of the second end of the valve housing 10, extends into an interior of the valve member driving section 2 and is connected to the piston 32. By constructing in this manner, the valve member 15 is adapted to be able to be driven, through the valve shaft 17, in the direction of the axial line L.

Around a portion of the valve shaft 17 which is adjacent the tip end portion of the valve shaft 17, a cylindrical stopper 18 for restricting a maximum opening position of the valve member 15 is mounted. This stopper 18 extends a predetermined length from the rear face of the valve member 15 along the valve shaft 17 (in this embodiment, the stopper 18 extends a length which is approximately equivalent to a half of a length of the valve flow channel 11 which is measured in direction of the axial line L). At the maximum opening position of the valve member 15, a tip end of the stopper 18 is adapted to be abutted against an abutment portion 31a of the partition wall 31. Moreover, on the rear face of the valve member 15, a spring seat 15a is provided. Between the spring seat 15a and the partition wall 31, two coil-shaped return springs 19a, 19b varying in diameter for causing the valve member 15 to be elastically biased toward a closing direction of the valve member 15 are provided so as to be coaxial with the axial line L.

Moreover, on the side of the rear face of the valve member 15, an assembly which comprises a tubular member 20 and a flexible bellows 21, and hermetically surrounds the valve shaft 17, the stopper 18 and the return springs 19a, 19b in the valve flow channel 11 is provided. The bellows 21 is adapted to be expanded and contracted according to the opening/closing operations of the valve member 15.

The tubular member 20 and the bellows 21 are hermetically connected to each other in the direction of the axial line L by welding or the like, so as to be coaxial with the axial line L. In this embodiment, the bellows 21 is arranged on the side of the tip end portion of the valve shaft 17 to which the valve member 15 is fixed, and the tubular member 20 is arranged on the side of the base end portion of the valve shaft 17 which is connected to the valve member driving section 2.

An end portion of the bellows 21 arranged on the side of the tip end portion of the valve shaft 17 is hermetically fixed to the rear face of the valve member 15 by welding or the like. Moreover, an end portion of the tubular member 20 arranged on the side of the base end portion of the valve shaft 17 is hermetically fixed to a portion of the valve housing 10 which is opposed to the rear face of the valve member 15 and is a wall defining the valve flow channel 11 on the side of the second end of the valve housing 10. More concretely, the end portion of the tubular member 20 is hermetically fixed, by welding or the like, in an inner peripheral edge of a ring-shaped support plate 22 arranged between the valve housing 10 and the partition wall 31 on the side of the second end of the valve housing 10.

The bellows 21 is a welded bellows which is made by causing a plurality of annular thin metal sheets to be overlapped, and alternately welding outer peripheries of adjacent metal sheets, and inner peripheries of adjacent metal sheets. The welded bellows is superior, in flexibility, to a molded bellows which is produced by pressure-molding a cylindrical metal material, and has the advantage that a length of the welded bellows can be restricted to be short at the time that the welded bellows is contracted, as compared to a molded bellows which has the same level of a flexing amount as that of the welded bellows.

Therefore, it is possible to cause the length of the welded bellows 21 to be made further short at the time that the welded bellows 21 is contracted, while ensuring a sufficient flexing amount of the welded bellows 21 which is required for the opening/closing operations of the valve member 15. Thus, correspondingly to the reduction of the length of the welded bellows 21, the tubular member 20, which has a length equivalent to a length to be reduced with respect to the bellows 21, is less expensive than the bellows, and superior to the bellows in durability since it has no flexibility, can be arranged around the valve shaft 17.

Moreover, the welded bellows is superior to the molded bellows in bending property and can be elastically deformed in a bending direction, so that even if forces in the bending direction are repeatedly applied to the welded bellows by fluid pressure, metal fatigue is hard to be produced by repeated bent-deformation of the welded bellows. In addition, if the same bellows is employed, the shorter the bellows is, the more the bent-deformation of the bellows by the fluid pressure is restricted, so that the metal fatigue is hard to be produced.

Therefore, in the illustrated embodiment, the length of the welded bellows 21 is restricted as short as possible within a range that does not allow interference with the opening/closing operations of the valve member 15.

By employing the welded bellows as the bellows 21 in this way, it is possible not only to cause the length of the bellows 21 to be restricted so as to be short, to thereby restrict the manufacturing cost, but also to prevent the production of crack and/or the like, which is brought about by the metal fatigue, in cooperation with the superior bending property of the welded bellows.

The tubular member 20 is made by forming a metal material into a tubular-shape, and has an outer diameter approximately equal to that of the bellows 21 along its total length and a length approximately equal to a half of a length of the valve flow channel 11 which is measured in the direction of the axial line L.

The valve member driving section 2 is constructed as a fluid pressure cylinder and includes a cylinder housing 30 which is coaxially connected to the second end of the valve housing 10. The cylinder housing 30 is formed into a substantially cylinder-shape or a substantially square pole-shape in the same manner as the valve housing 10 is done. The cylinder housing 30 is provided, at one end thereof relative to the direction of the axial line L, with the partition wall 31 separating the cylinder housing 30 from the valve housing 10, and has a cylinder bore 33 formed therein. Within the cylinder bore 33, the piston 32 is slidably housed through a sealing member 34 and a fluid ring 35. Moreover, between the cylinder housing 30 and the valve housing 10, the support plate 22 is fixed with an outer peripheral portion thereof being interposedly held. As discussed above, the valve shaft 17 is slidably and airtightly penetrated through the partition wall 31 through a sealing member 31b, extends into the cylinder bore 33, and is connected at the base end portion thereof to the piston 32.

On the side of one end of the piston 32, a pressure chamber 36 which is defined by the piston 32 and the partition wall 31 is provided. The pressure chamber 36 is communicated with an operating port 37 which is opened to a side wall of the cylinder housing 30. On the other hand, on the side of the other end of the piston 32, a respiratory chamber 39 which is defined by a lid plate 38 attached to the cylinder housing 30, and the piston 32 is provided. The respiratory chamber 39 is opened to the outside through a respiratory hole 38a which is formed in the lid plate 38 or the cylinder housing 30.

Therefore, when the pressure chamber 36 is opened to the outside through the operating port 37, the valve member 15 is advanced by the biasing forces of the return springs 19a, 19b, so that the valve-sealing member 16 is abutted against the valve seat 14 as shown in the left half of FIG. 1, whereby the valve seat 14 is closed. In this condition, a vacuum chamber and a vacuum pump which are connected to the first port 12 and the second port 13, respectively, are isolated from each other.

On the other hand, when pressurized fluid such as compressed air or the like is fed to the pressure chamber 36 through the operating port 37, the piston 32 is retracted against the biasing forces of the return springs 19a, 19b, whereby the valve member 15 is retracted, so that the valve-sealing member 16 of the valve member 15 is separated from the valve seat 14 to thereby open the valve seat 14 (see the right half of the valve in FIG. 1). In this condition, the vacuum chamber and the vacuum pump which are connected to the first port 12 and the second port 13, respectively, are communicated with each other.

According to the high vacuum valve having the above-mentioned structure, in hermetically surrounding a periphery of the valve shaft 17, the structure is employed in which the tubular member 20 and the welded bellows 21 superior to the molded bellows in flexibility are connected to each other in the direction of the axial line L, whereby it is possible to cause the length of the bellows to be restricted so as to be short, while ensuring a sufficient flexing amount of the bellows which is required for the opening/closing operations of the valve member 15. As a result, it is possible to restrict the production cost of the whole valve.

Moreover, the welded bellows is superior to the molded bellows in the bending property. In addition, by causing the length of the bellows to be restricted so as to be short, it is possible to further reduce the bent-deformation of the bellows which is brought about by the fluid pressure, so that even if forces in the bending direction are repeatedly applied to the bellows by high fluid-pressure, the metal fatigue is hard to be produced and the bellows can sufficiently withstand the application of the high vacuum valve under severe conditions, thus making it possible to ensure the long life of the high vacuum valve.

Incidentally, in the above mentioned embodiments, the first port 12 and the second port 13 are not particularly limited to being connected to either of the vacuum chamber and the vacuum pump, and the flow direction of the fluid does not depend upon a positional relationship between the location of the bellows and the location of the tubular member, and may be any direction.

Moreover, it should be understood that the present invention is not limited to the above-mentioned embodiments and that various changes and modifications may be made in the invention without departing from the spirit of the invention as set forth in the accompanying claims.

What is claimed is:

1. A high vacuum valve comprising:
a housing having a valve flow channel provided in an interior thereof so as to extend in a direction of an axial line, a first opening formed in one end of said valve flow channel relative to said direction of said axial line, and a second opening formed in said housing so as to be oriented toward a direction perpendicular to said axial line;
a first port connected to said first opening of said housing and communicated with said valve flow channel through said first opening;
a second port connected to said second opening and communicated with said valve flow channel through said second opening;
a valve seat provided around said first opening;

a valve member housed in said valve flow channel for opening and closing said valve seat;

a valve shaft received in said valve flow channel and extending in said direction of said axial line from a rear face of said valve member in said valve flow channel;

a valve member driving section for driving, through said valve shaft, said valve member in said direction of said axial line; and an assembly comprising a bellows and a tubular member;

said bellows housed in said valve flow channel and hermetically surrounding a periphery of said valve shaft;

said bellows comprising a welded bellows;

said welded bellows being formed by causing a plurality of annular thin metal sheets to be overlapped, and alternately welding outer peripheries of adjacent metal sheets, and inner peripheries of adjacent metal sheets;

the tubular member housed in said valve flow channel and hermetically surrounding said periphery of said valve shaft;

said tubular member and said welded bellows being connected to each other in said direction of said axial line; and said assembly being fixed at an end portion of the bellows to said rear face of said valve member and fixed at an end portion of the tubular member to a portion of said interior of said housing which is opposed to said rear face of said valve member.

2. A high vacuum valve according to claim 1, wherein said tubular member has a length approximately equivalent to a half of a length of said valve flow channel which is measured in said direction of said axial line.

* * * * *